(12) United States Patent
Pytlik et al.

(10) Patent No.: US 9,337,480 B2
(45) Date of Patent: May 10, 2016

(54) ANODE MIXTURE, BUTTON CELL WITH AN ANODE COMPRISING METAL PARTICLES, AND PRODUCTION THEREOF

(71) Applicant: VARTA Microbattery GmbH, Ellwangen (DE)

(72) Inventors: Edward Pytlik, Ellwangen (DE); Martin Krebs, Rosenberg (DE)

(73) Assignee: VARTA Microbattery GmbH (DE)

( * ) Notice: Subject to any disclaimer, the term of this patent is extended or adjusted under 35 U.S.C. 154(b) by 274 days.

(21) Appl. No.: 14/055,112

(22) Filed: Oct. 16, 2013

(65) Prior Publication Data

US 2014/0106188 A1  Apr. 17, 2014

(30) Foreign Application Priority Data

Oct. 17, 2012 (EP) ................... 12188879

(51) Int. Cl.
| | | |
|---|---|---|
| *H01M 4/04* | (2006.01) | |
| *H01M 4/36* | (2006.01) | |
| *H01M 10/04* | (2006.01) | |
| *H01M 4/08* | (2006.01) | |
| *H01M 4/42* | (2006.01) | |
| *H01M 4/62* | (2006.01) | |
| *H01M 2/02* | (2006.01) | |
| *H01M 4/12* | (2006.01) | |
| *H01M 4/38* | (2006.01) | |
| *H01M 10/30* | (2006.01) | |
| *H01M 10/32* | (2006.01) | |
| *H01M 10/34* | (2006.01) | |
| *H01M 4/02* | (2006.01) | |

(52) U.S. Cl.
CPC ............. *H01M 4/364* (2013.01); *H01M 4/08* (2013.01); *H01M 4/366* (2013.01); *H01M 4/42* (2013.01); *H01M 4/621* (2013.01); *H01M 4/625* (2013.01); *H01M 10/0427* (2013.01); *H01M 2/0222* (2013.01); *H01M 4/04* (2013.01); *H01M 4/12* (2013.01); *H01M 4/38* (2013.01); *H01M 10/30* (2013.01); *H01M 10/32* (2013.01); *H01M 10/345* (2013.01); *H01M 2004/027* (2013.01); *Y10T 29/4911* (2015.01)

(58) Field of Classification Search
CPC ............. H01M 2004/027; H01M 4/04; H01M 4/0416; H01M 4/043; H01M 4/134; H01M 4/1395; H01M 10/0427; H01M 2/0222
See application file for complete search history.

(56) References Cited

U.S. PATENT DOCUMENTS

| | | | |
|---|---|---|---|
| 3,954,506 A | 5/1976 | Sullivan | |
| 4,181,778 A * | 1/1980 | Land | 429/53 |
| 4,476,205 A | 10/1984 | Menard | |
| 5,378,560 A * | 1/1995 | Tomiyama | 429/217 |
| 6,384,574 B1 * | 5/2002 | McHugh et al. | 320/107 |
| 2002/0031708 A1 | 3/2002 | Krause et al. | |
| 2003/0198870 A1 * | 10/2003 | Wariishi et al. | 429/313 |
| 2004/0197656 A1 | 10/2004 | Durkot et al. | |
| 2005/0003271 A1 * | 1/2005 | Jiang et al. | 429/229 |
| 2006/0024570 A1 * | 2/2006 | Zhu | 429/144 |
| 2006/0245363 A1 * | 11/2006 | Ravindran et al. | 370/238 |
| 2006/0246353 A1 * | 11/2006 | Guo et al. | 429/245 |
| 2012/0070739 A1 * | 3/2012 | Akca et al. | 429/218.1 |

FOREIGN PATENT DOCUMENTS

| | | |
|---|---|---|
| DE | 10 2009 023 126 A1 | 11/2010 |
| GB | 1 232 582 A | 5/1971 |

OTHER PUBLICATIONS

Fluidized Bed, Thermopedia TM, Sep. 7, 2010.*

* cited by examiner

*Primary Examiner* — Anca Eoff
(74) *Attorney, Agent, or Firm* — DLA Piper LLP (US)

(57) ABSTRACT

A method of producing a button cell having an anode including metal particles, including providing an anode mixture including as constituents metal particles, at least one binder, at least one conducting agent and, optionally, a gassing inhibitor, providing a button cell housing, introducing the mixture into the button cell housing, admixing the mixture with an electrolyte, and liquid-tight sealing of the housing, wherein the constituents of the mixture are contacted in the presence of water prior to introduction into the housing, and after the contacting the water is removed from the mixture at least partially.

1 Claim, No Drawings

ANODE MIXTURE, BUTTON CELL WITH AN ANODE COMPRISING METAL PARTICLES, AND PRODUCTION THEREOF

TECHNICAL FIELD

This disclosure relates to a method of producing button cells having an anode comprising metal particles, and a button cell producible according to the method, and an anode mixture.

BACKGROUND

Typically, button cells have a housing composed of two housing halves, a cell cup and a cell lid. These parts can be manufactured using nickel-plated sheet metal to deep draw and obtain punch drawing parts, for example. Conventionally, the cell cup has a positive polarization and the cell lid has a negative polarization. Different types of electrochemical systems can be contained within the housing, for example, zinc/manganese oxide, zinc/air, silver oxide/zinc, mercury oxide/zinc, primary and secondary lithium-ion systems, or secondary systems like nickel/cadmium or nickel/metal hydride.

The electrodes of such electrochemical systems are in general composite electrodes including particles made of an electrochemically active material, a binder and, optionally, a particulate and conductivity enhancing constituent, like carbon black. The binder provides for mechanical resistance of the electrode, in particular the binder is to ensure contacting of the particles made of electrochemically active material among themselves and contacting to the current collector. Contacting problems are likely to occur, for example, due to gassing as a result of electrolyte decomposition or due to volumetric dynamics of particles during charging and discharging operations. The result of decontacting is often that electrodes cannot be discharged completely. This means that the theoretical energy content of an electrode is not depleted exhaustively.

DE 10 2009 023 126 A1 discloses a button cell, wherein the negative electrode is composed of zinc particles (the electrochemically active material), a particulate non-metallic conducting agent, and a binder. For production of such a button cell zinc powder, the non-metallic conducting agent, and the binder are extensively agitated in dry condition. The obtained powder is trickled into the cell lid of a button cell housing and an electrolyte is added. The cell lid is combined with an appropriate sealing and a matching cell cup including a cathode. Finally, the cell is closed.

In practice, that cell exhibited good to very good capacity values, in particular ascribed to good contacting of the zinc particles among themselves. These characteristics are attributed to the extensive dry intermingling of the electrode particles.

However, dry mixtures have a significant drawback. During processing of dry mixtures, there is a tendency toward segregation and, thus, to dehomogeneous distribution of the binder and the conducting agent in the electrode, in particular the size of the binder and conducting agent particles is greatly different from the size of the zinc particles.

There is thus a need to provide button cells that can be produced in a simple manner and exhibit a very high capacity.

SUMMARY

We provide a method of producing a button cell having an anode including metal particles, including providing an anode mixture including as constituents metal particles, at least one binder, at least one conducting agent and, optionally, a gassing inhibitor, providing a button cell housing, introducing the mixture into the button cell housing, admixing the mixture with an electrolyte, and liquid-tight sealing of the housing, wherein the constituents of the mixture are contacted in the presence of water prior to introduction into the housing, and after the contacting the water is removed from the mixture at least partially.

We also provide a method of producing a button cell having an anode including metal particles, including providing an anode mixture including as constituents metal particles, at least one binder, at least one conducting agent and, optionally, a gassing inhibitor, providing a button cell housing, introducing the mixture into the button cell housing, admixing the mixture with an electrolyte, and liquid-tight sealing of the housing, wherein the constituents of the mixture are contacted in the presence of water prior to introduction into the housing.

We further provide an anode mixture for button cells including for constituents metal particles, at least one binder, at least one conducting agent and, optionally, at least one gassing inhibitor, produced by a method including contacting the constituents in the presence of water, removing the water and, optionally, comminution of obtained agglomerates.

DETAILED DESCRIPTION

It will be appreciated that the following description is intended to refer to specific examples and is not intended to define or limit the disclosure, other than in the appended claims.

We provide a method comprising:
(1) providing an anode mixture comprising as constituents metal particles, at least one binder, and at least one conducting agent,
(2) providing a button cell housing,
(3) introducing the mixture into the button cell housing,
(4) admixing the mixture with an electrolyte, and
(5) liquid-tight sealing of the housing.

DE 10 2009 023 126 A1 mentions some utile binders, conducting agents, and button cell housing components. In particular, alkaline electrolytes are eligible as electrolytes for anodes including metal particles. Closing the housing is typically effected by a flanging process. However, contacting the constituents of the anode mixture in the presence of water previous to introduction into the button cell housing is not disclosed.

The phrase "contacting in the presence of water" is meant to describe that the metal particles, the at least one binder, and the at least one conducting agent (as well as optionally facultative constituents of the anode mixture to be prepared) are processed in the presence of water to obtain a mixture, wherein all the three constituents immediately contact one another. Contacting of the constituents can be effected in different ways.

In one example, initially the metal particles, the at least one binder, and the at least one conducting agent are processed to obtain a mixture, and then the water is added to the mixture. As an alternative, another option is to add the water as early as during mixing of the constituents.

In another example, for contact purposes, the at least one binder can be admixed with water or dissolved in water, and the obtained admixture or the solution be added to the metal particles and the at least one conducting agent, preferably subsequent to intermingling of these constituents.

In another example, for contact purposes, the at least one binder and the at least one conducting agent can be admixed with water and/or dissolved in water, and the admixture and/or the solution be applied to the surface of the metal particles, in particular sprayed on the surface.

The described procedure entails marked advantages. On the one hand, water promotes uniform attaching of the at least one conducting agent on the surface of the metal particles. The above discussed segregations can thereby largely be prevented. Furthermore, there is evidence that, as compared to known methods, minor amounts of conducting agent are required to cause the desired effect, namely a defined increase in conductivity.

Particularly preferred is that the anode mixture to be prepared comprises at least one gassing inhibitor. The function of the gassing inhibitor is to suppress a contingent gas evolution, in particular hydrogen evolution, during operation of a button cell.

In a procedure according to the first example above, the gassing inhibitor can be admixed to the other three constituents previously to the addition of water or added together with the water. In particular, another option is that the water is admixed with the at least one gassing inhibitor or the at least one gassing inhibitor is dissolved in the water.

The latter feature applies also in case of the procedure according to the other examples above. Even with these examples, it may be preferred to admix the water with the at least one gassing inhibitor or to dissolve the at least one gassing inhibitor in the water (together with the at least one binder). However, the gassing inhibitor may also be furnished together with the metal particles (the third example) or the metal particles and the at least one conducting agent (the second example).

The at least one gassing inhibitor is deposited directly onto the surface of the metal particles during contacting so that metal particles are obtained, with the surface of the particles coated by the at least one conducting agent and the at least one gassing inhibitor. Thereby, the at least one conducting agent and the at least one gassing inhibitor are fixed on the surface by the at least one binder.

For contacting of the described constituents, the water is used preferably in finely distributed form, in particular in the form of an atomized spray. Thus, a mixture according to the first example can be sprayed with atomized water, for example. Also, mixtures of water-binder, water-binder-gassing inhibitor, water-binder-conducting agent, and water-binder-conducting agent-gassing inhibitor can be applied during a spray procedure to the surface of the metal particles.

The contacting of the components is preferably effected by a mechanical mixer, in particular a fluidized-bed mixer, or a mill, in particular of a vertical or horizontal granulator. Such devices are in general equipped with metering systems which allow introduction of the water as an atomized spray or of the above mentioned aqueous mixtures, for example. Thus, the metal particles can be furnished in the fluidized bed of a fluidized-bed mixer, and treated in the mixer with an atomized spray composed of a water-binder-conducting agent-gassing inhibitor mixture, for example.

Regularly, it is preferred that the water added during or for the purpose of contacting is removed after contacting (and preferably prior to introduction of the anode mixture into the button cell housing and/or prior to admixing the mixture with an electrolyte) at least partially, preferably completely, typically during a drying procedure. Drying can be effected by heating and/or application of a vacuum, for example. Corresponding heating devices or equipment for application of a vacuum can be components of the mentioned mixers or mills.

During contacting, the water in combination with the binder commonly causes formation of agglomerates which are hard to process beyond a certain size. Preferably, the process of contacting in the presence of water is followed by a comminution step, in particular a grinding or milling procedure. Upon contacting and/or subsequent drying in a mill, the obtained agglomerates can be broken up immediately.

The composite material obtained in the drying step and/or the comminution step can be introduced directly into the button cell housing according to step (3).

The metal particles employed in the method are preferably particles made of zinc, iron, cadmium, copper, aluminum, or alloys of the metals. In addition, even mixtures or blends of the metals or metal alloys can be employed. In particular, the metal particles are zinc particles used in the form of a zinc powder.

Correspondingly, the button cells produced are preferably silver/zinc, zinc/air, nickel/zinc, or zinc/manganese oxide batteries, or nickel/cadmium batteries.

Furthermore, the metal particles can be particles made of a hydrogen storage alloy. Correspondingly, the button cells produced are preferably nickel/metal hydride batteries.

Preferably, the metal particles are used in an average particle size of less than 500 µm, preferably less than 350 µm, in particular less than 200 µm.

The at least one conducting agent is preferably selected from the group consisting of graphite, activated carbon, carbon nanotubes, and mixtures thereof. Preferably, the conducting agent is graphite.

The preferred average particle size of the at least one conducting agent is less than 100 µm, preferably less than 50 µm, in particular less than 20 µm.

The at least one binder is preferably a binder that is processable in water, in particular selected from the group consisting of polyacrylate, carboxymethyl cellulose, in particular sodium or potassium carboxymethyl cellulose, and mixtures thereof.

Particularly preferably, the at least one binder is an acrylate-based polymer crosslinked using a polyalkenyl polyether. The use of such polymers as a binder for electrodes of electrochemical cells is well-known, and they are distributed under the trade name Carbopol® (a registered trade mark of the Lubrizol Advanced Materials, Inc., Cleveland Ohio, USA).

We believe that, to date, such acrylate-based polymers as electrode binders had to be used in combination with carboxymethyl cellulose or a carboxymethyl cellulose derivative to compensate hydrophobic characteristics of the acrylate-based polymer. In contrast, our methods allow abandonment of the addition of carboxymethyl cellulose or a carboxymethyl cellulose derivative.

The at least one gassing inhibitor, which preferably is a constituent included in the anode mixture, is in general a surfactant substance, in particular selected from the group consisting of polyethylene glycol, polyethylene glycol ethers, and mixtures thereof. Appropriate polyethylene glycol ethers are in particular C8-phenol polyethylene glycol ethers and dodecyl polyethylene glycol ethers, distributed under the trade names Triton-X and Brij, for example.

The addition of at least one gassing inhibitor may be particularly preferred, in case the metal particles are zinc particles, and the zinc particles are used in combination with an alkaline electrolyte.

Particularly preferably, the anode mixture includes:
0.05 to 5% by weight, preferably 0.1 and 1% by weight, in particular 0.1 and 0.5% by weight of the at least one conducting agent, and/or 0.05 to 5% by weight, preferably 0.1 and 2.5% by weight, in particular 0.1 and 1% by weight of the at least one binder, and/or 0.05 to 1% by weight, preferably 0.05 and 0.5% by weight, in particular 0.05 and 0.2% by weight of the at least one gassing inhibitor, and 85% by weight to 99.95% by weight of the metal particles.

The above mentioned percentages are in each case in relation to the total weight of the mixture in a dry condition, that is before water and/or electrolyte is added thereto, and preferably sum up to 100% by weight.

Furthermore, we provide button cells produced according to our methods described above or producible according to such methods. The button cell can be both a secondary button cell or a primary button cell, in particular of the silver/zinc, zinc/air, nickel/zinc, zinc/manganese oxide, nickel/cadmium, or nickel/metal hydride type.

Our button cells are characterized by an improved electrode structure, in particular an improved anode structure. As explained above, the methods result in metal particles, wherein at least one conducting agent and, optionally, at least one gassing inhibitor are deposited and fixed on the particle surface. Consequently, there is an improved electrical connection among the metal particles maintained even during electrochemically induced volumetric variations. Thereby, the button cell can be discharged more efficiently. In the presence of the at least one gassing inhibitor on the surface of the metal particles, gas evolutions, in particular hydrogen evolution within the anode, and decontacting and volume variations involved therein, are largely prevented or at least reduced. As a result, safety aspects of the button cell are improved as well.

The anode mixture is intended in particular for use in the button cells as described. The anode mixture comprises for constituents the described metal particles, the described at least one binder, the described at least one conducting agent, and preferably the described at least one gassing inhibitor.

Preferably the anode mixture is composed of metal particles with the surface of the particles coated by the at least one binder, wherein the at least one conducting agent and, optionally, the at least one gassing inhibitor are incorporated into the coating layer made of the at least one binder.

Particularly preferred is that the anode mixture is composed of coated zinc particles.

The coated particles typically have an average particle size of 10 μm to 250 μm.

In general, the anode mixture is an intermediate product of our methods as described, namely a result of the steps:
contacting the constituents in the presence of water,
removing the water,
optionally, comminution of obtained agglomerates.

The anode mixture is not mandatorily processed directly, in fact, the anode mixture can be stored and distributed separately. To that end, the anode mixture can be portioned and packaged, for example, in packages made of synthetic material or in appropriate containers.

Further features of our methods and button cells will become apparent from the description below of representative examples. Therein, the individual features can each be realized in an example on their own or in combinations of two or more. The described particular examples are merely for illustration and better understanding and are in no way to be interpreted as a limitation.

Examples (1) For production of an anode mixture, zinc powder having an average particle size of approximately 200 μm was extensively intermingled with graphite powder having an average particle size of ca. 10 μm in a fluidized-bed mixer. Thereby, the graphite particles were deposited on the surface of the zinc particles. Subsequently, an aqueous solution of Carbopol® was introduced in the form of a fine atomized spray. The amount and concentration of the Carbopol® solution were composed such that, in relation to the total weight of the forming anode mixture (in the dry condition), ca. 0.2% by weight of Carbopol® were deposited on the zinc powder. Subsequently, the obtained Carbopol®-coated zinc particles were dried. In a final grinding procedure, the obtained particle agglomerates were broken up.

(2) For production of an anode mixture, an aqueous solution of Carbopol® was prepared and graphite powder suspended therein. Zinc powder having an average particle size of approximately 200 μm was furnished in a fluidized-bed mixer. Subsequently, the suspension was fed into the fluidized-bed mixer in the form of a fine atomized spray. The reaction conditions were adjusted such that, in relation to the total weight of the forming anode mixture (in the dry condition), ca. 0.2% by weight of graphite particles and 0.3% by weight of Carbopol® were deposited on the zinc powder. Subsequently, the obtained Carbopol®-coated zinc particles were dried. In a final grinding procedure, the obtained particle agglomerates were broken up.

(3) For production of zinc-air button cells, the powder anode mixtures prepared according to (1) and (2) were each trickled into the cell lids of appropriate button cell housings and admixed with an alkaline electrolyte. The cell lids were provided with a sealing and subsequently combined to a cell cup including an air cathode. The cell was closed by bending the cutting edge of the cell cup over the edge of the cell lid.

The improved contact characteristics are attributed in particular to the already described composite structure of the particles. After addition of the electrolyte, the binder shell of the particles is subject to some swelling, and a paste is forming, wherein the binder is incorporated in particular in the interstices forming between the particles, and thus imparts mechanical resistance to the anode. The partial coating of the metal particles using the conducting agent is maintained during this procedure and contributes to the conductivity of the electrode in addition to the direct contact of particles among themselves. In the case of an electrochemically induced expansion of the metal particles, the conducting agent is compacted to larger agglomerates due to friction, such that the conducting structure is retained.

Although our buttons cells and methods have been described in connection with specific forms thereof, it will be appreciated that a wide variety of equivalents may be substituted for the specified elements described herein without departing from the spirit and scope of this disclosure as described in the appended claims.

The invention claimed is:

1. A method of producing a button cell having an anode including metal particles, comprising:
providing an anode mixture comprising as constituents metal particles, at least one binder, at least one conducting agent and, optionally, a gassing inhibitor,
providing a button cell housing,
introducing the mixture into the button cell housing,
admixing the mixture with an electrolyte, and
liquid-tight sealing of the housing,
wherein
the constituents of the mixture are contacted in the presence of water prior to introduction into the housing, and after the contacting the water is at least partially removed from the mixture, and after at least partial removal of the water and prior to introduction into the housing, the mixture is ground into a powder.

* * * * *